United States Patent [19]
Woodward

[11] 3,794,375
[45] Feb. 26, 1974

[54] DETACHABLE VEHICLE ENCLOSURE

[76] Inventor: Ernest F. Woodward, 11 Circle Drive, Camp Hill, Pa.

[22] Filed: Oct. 4, 1971

[21] Appl. No.: 186,051

[52] U.S. Cl. ................... 296/36, 105/386, 296/43
[51] Int. Cl. .................... B62d 27/06, B62d 33/04
[58] Field of Search .......... 296/36, 43, 3, 10, 28 M; 105/369 A, 386, 423; 52/127

[56] References Cited
UNITED STATES PATENTS
| | | | |
|---|---|---|---|
| 3,126,224 | 3/1964 | Carter et al. | 296/43 X |
| 3,203,147 | 8/1965 | Penley | 52/127 X |
| 630,858 | 8/1899 | Carskadon | 296/36 |
| 3,097,012 | 7/1963 | Bain | 296/43 X |
| 3,097,880 | 7/1963 | Reader | 296/43 X |

*Primary Examiner*—Kenneth H. Betts
*Assistant Examiner*—John A. Pekar

[57] ABSTRACT

A load carrying vehicle such as a flat-car, flat-bed trailer or truck having no sides but which have stake pockets, can be converted to a side enclosed platform by utilizing stakes having panel edge retaining brackets thereon, in which panels can be slidably inserted in order to build up walls of any desired length. The panels may be assembled or removed one at a time in random order by one person without tools.

7 Claims, 19 Drawing Figures

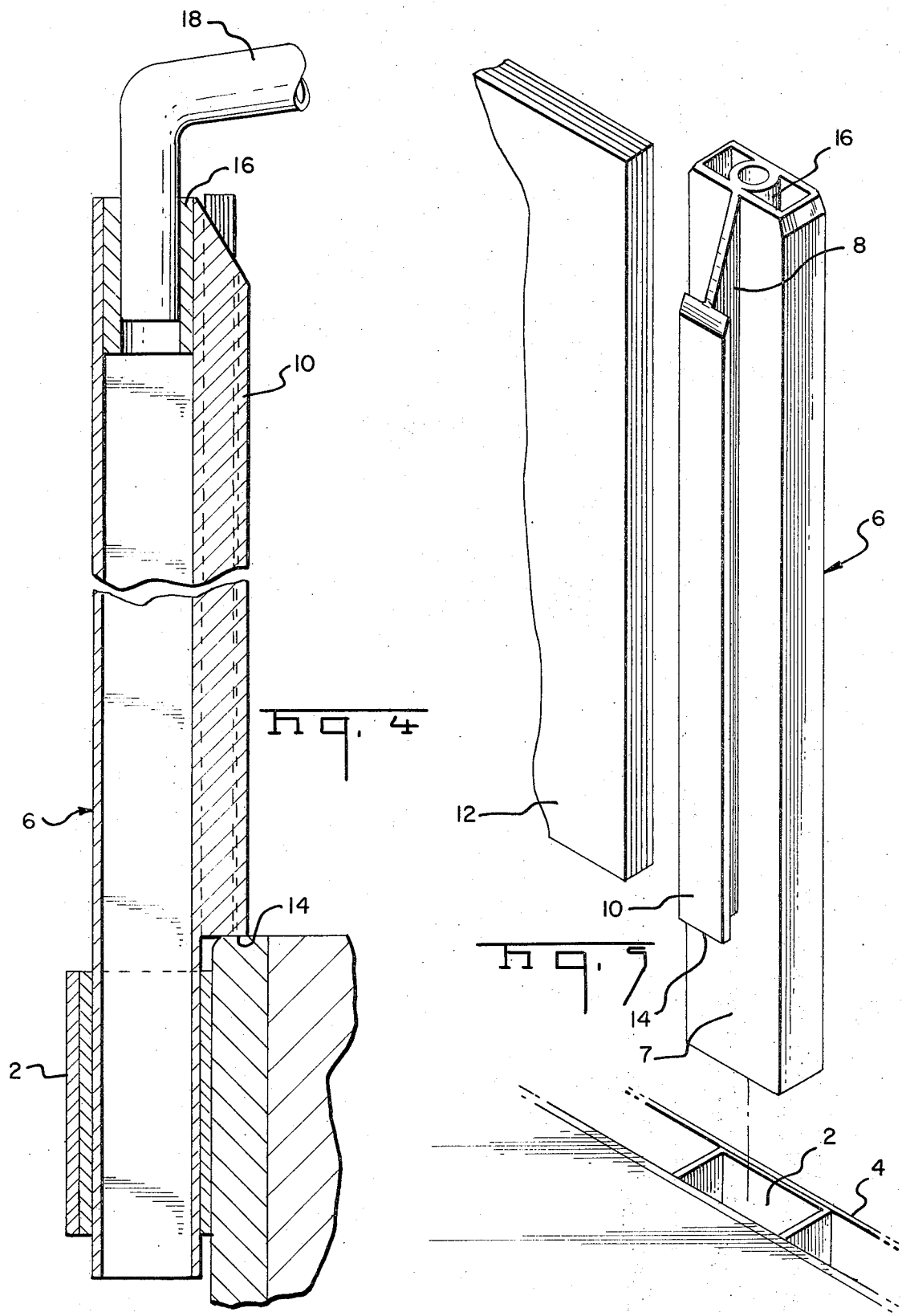

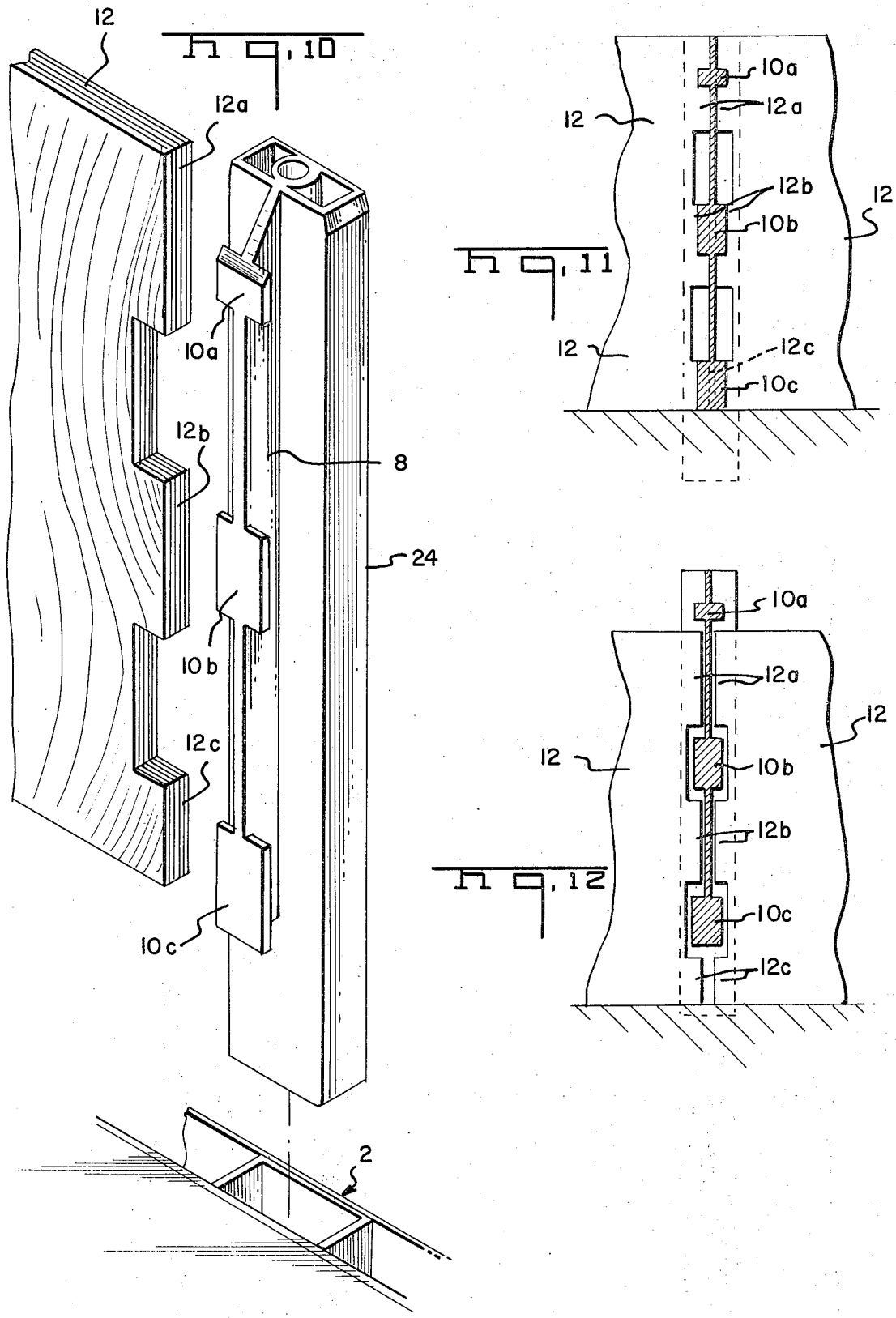

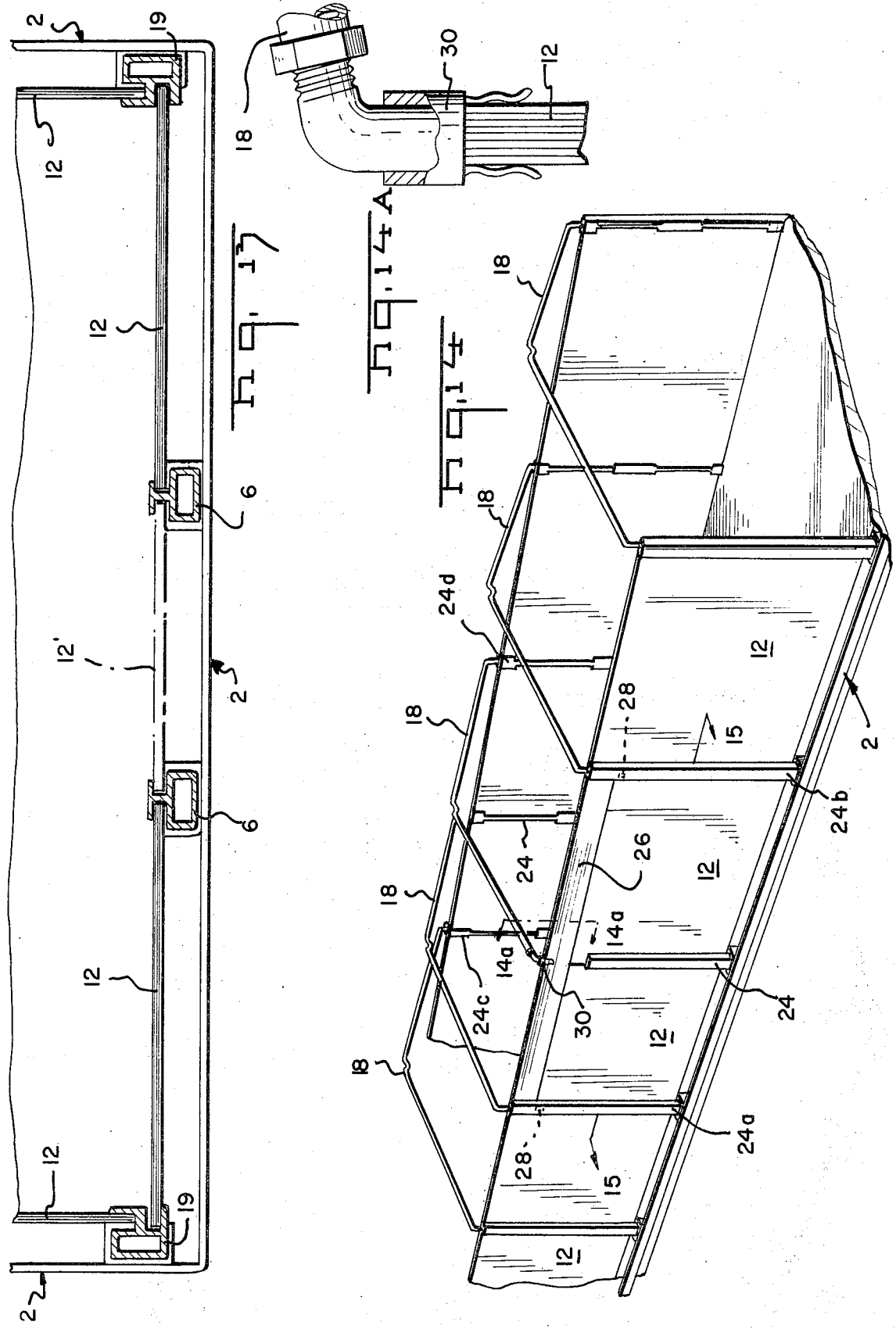

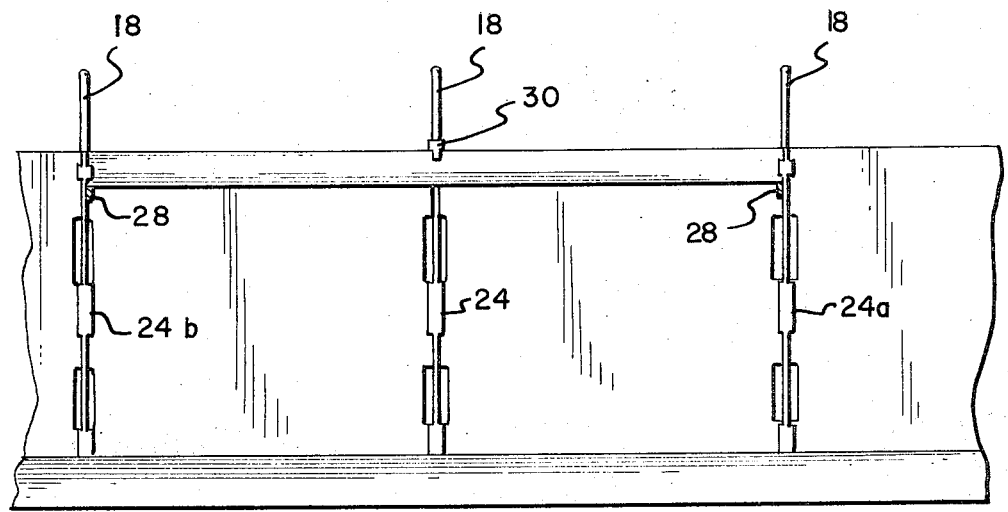
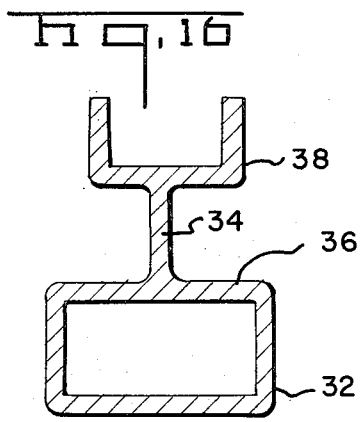
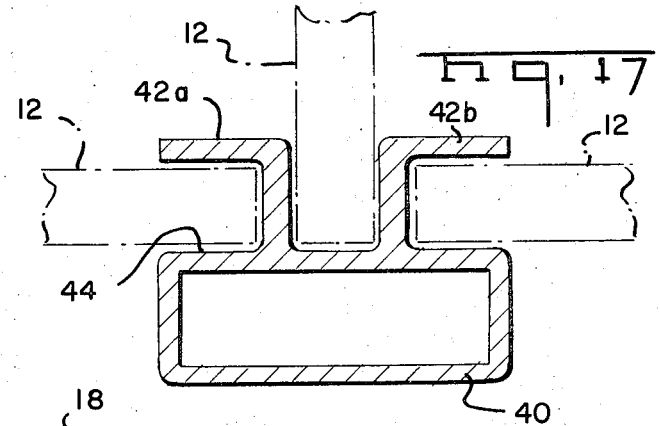
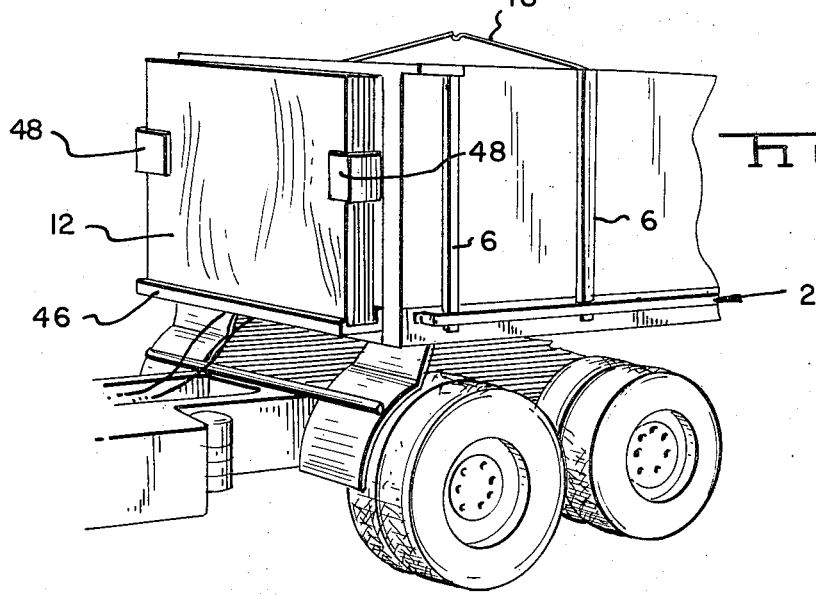

DETACHABLE VEHICLE ENCLOSURE

This invention relates to the provision of structure by which side and end walls may be removably attached to the platform of a flat-bed trailer, truck or flat-car by one person without the use of tools.

Many of the presently used trucks, trailers and railroad freight cars are built without a top or sides because certain types of loads can be handled only by cranes for installing or removing them from overhead. Other types of loads can be handled from the sides, as for example by fork-lift trucks. However, when the loads are enroute they are unprotected from the weather and from possibly shifting to a point where they overhang the sides or end of the truck or possibly falling off. To protect cargo against these possibilites, only large sections of panels bolted to several spaced stakes are currently available on the market, the stakes protruding from the bottom of the panel for entry into the stake pockets which are usually mounted about the edges of the load carrying platform. In many cases, these sections must be custom made for the particular truck. The stakes are spaced distances to correspond to the distances between the pockets, which distances may vary from one vehicle to another and even in the same vehicle. These sides with attached stakes are extremely heavy and bothersome to move around especially on a windy day, and necessitates the time of two persons to install or to remove and store them when not used. Each section moreover, must follow a preceeding section for installation and removal, since adjacent sections must be interlocked. Furthermore, the panels with their attached stakes take up a large amount of space when stored. They also constitute a heavy load to transport since each panel, regardless of how long it is, has a stake at its forward and rear edges. If the panels are short, perhaps two or three feet in length to render them easier to be manipulated by one person, then the number of stakes used for one vehicle is multiplied. Since the stakes are usually of solid oak and of such dimensions as to withstand substantial force, they are heavy. If the panel sections are longer, as for example twice the length indicated above, so that only one intermediate stake is used in order to brace the panel or section, a lesser number of stakes per vehicle are used. But in that case, the sections are so bulky and heavy as to make it impossible for one person to install or remove.

With the present invention, the stakes and panels which make up the parts to be removably installed on the vehicle, are separately installed and removed from each other and from the vehicle one at a time. Moreover, each stake is utilized to removably and independently retain two adjacent panels so that any panel can be removed at any time without disturbing other panels. Each panel, which may be a flat sheet such as plywood, may be stored flat on top of the stakes laid side-by-side, thus saving space as compared to that necessary to store the presently available side sections described above.

It is therefore an object of the invention to provide a sectional side and end wall construction for a flat-bed truck, trailer or rail car which is easily installed and removed.

It is a further object of the invention to provide such a sectional side and end wall construction for a vehicle, as indicated above, utilizing a less number of parts per unit of length than that currently available.

Another object of the invention is to provide a sectional side and end wall construction for a vehicle having parts which can be stored in a minimum of space.

An additional object of the invention is to provide a removable enclosure for a normally open vehicle in which the walls may very in height. The above and other objects will become apparent as the description of the invention proceeds with specific reference to the various Figures of the drawing in which:

FIG. 4 is a cross-section taken along line 4—4 of FIG. 1 showing the stake within the pocket and one end of a tarpaulin bow support in the socket provided therefor;

FIG. 5 is a perspective view of a stake, panel and stake pocket in an exploded view;

FIG. 10 is an exploded view of another form of stake, stake pocket and panel edge notched to cooperate with the stake;

FIGS. 11 and 12 are side views showing the panel being disassembled from the stake shown in FIG. 10;

FIG. 13 is a plan view of an alternate tail-gate assembly with a removable central panel forming a small door;

FIG. 14 is a perspective view of the load carrying platform of a vehicle with the sectional side wall panels in place, a door and header assembly and tarpaulin bow support in place;

FIG. 14a shows partly in section, a socket construction attachable to the header bar for supporting one end of a bow;

FIG. 15 is a front view of a sectional door assembly as seen from within the vehicle;

FIGS. 16 and 17 are horizontal cross-sectional views of stakes that receive panels on three sides where a partition is utilized;

FIG. 18 is a perspective view of the side panels when not in use stored on a truck.

Figure 1:
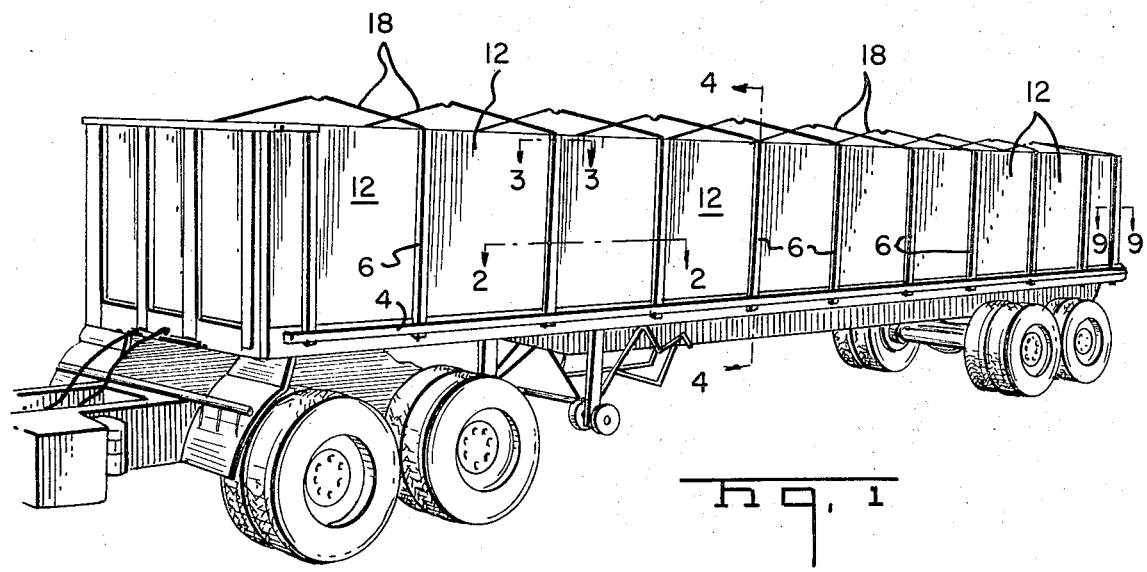
FIG. 1 is a perspective view of a truck or trailer boxed in according to the invention.
Figure 2:
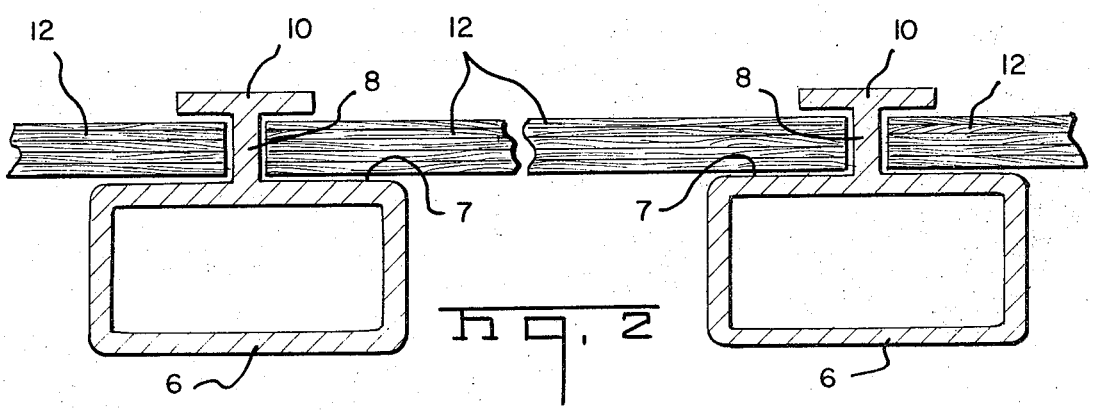
FIG. 2 is a cross-sectional view taken along line 2—2 of FIG. 1 showing the panel extending between and retained by a pair of stakes.
Figure 3:
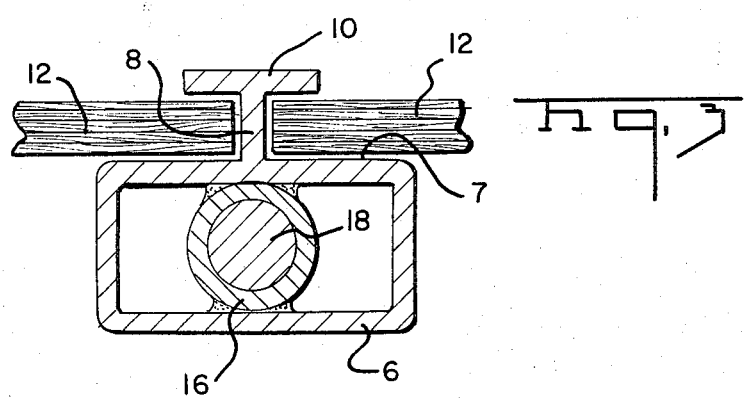
FIG. 3 is a cross-sectional view taken along line 3—3 of FIG. 1 showing a hollow-stake provided with a socket in which one end of a bow which supported a tarpaulin, is inserted.

The conventional truck or trailer without sides or top, such as shown in FIG. 1, is provided with spaced stake pockets 2 secured to the edges of the floor or load-carrying platform of the vehicle. Also secured to the edges of the floor by offsets and/or directly to the pockets 2 which have a depth of about six inches, is a rail 4 used for fastening the ends of tie-down ropes which lash the cargo. In order to provide side walls for such open cargo carrier which may be easily assembled and disassembled by one person without the need for tools, I provide stakes such as to which are slidably inserted into the pockets 2. Each stake 6 is of a size and shape to slidably fit the pocket to be supported thereby in upright position and is provided on its inner face 7 with a bracket which is T-shaped in cross-section, the leg of the T being connected at its edge to or integrally formed edgewise with the inner wall of the stake and projecting at right angles therefrom. The length of the leg is substantially equal to the thickness of panel 12, which may be of plywood or any other desired material, which is to form a section of the enclosure. The head 10 of the T extends parallel to the inner wall 7 of the stake on each side of the leg 8, to form channels with the wall for slidably accommodating adjacent panels 12 between the adjoining channels. The t-shaped bracket extends along the major portion of the length of the stake, as shown in FIGS. 4 and 5 and terminates at a distance from the bottom end of the stake in order to allow the latter to be slipped into the pocket 2. The wall 8 of the bracket protrudes forwardly sufficiently so that its lowermost end 14 rests on the floor to support the stake thereon.

Figure 6:
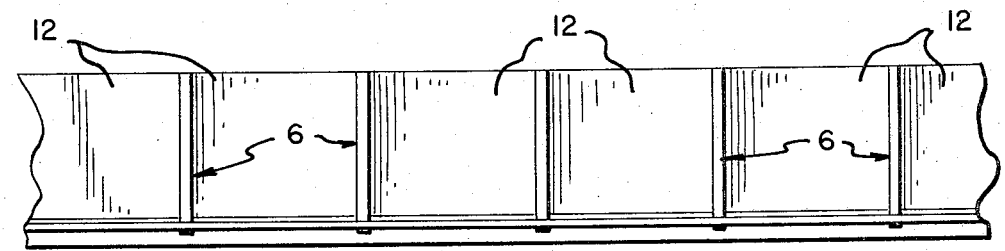
FIGS. 6, 7 and 8 are side views of illustrating the removal of a stake and panels from a previously assembled side wall.
Figure 7:
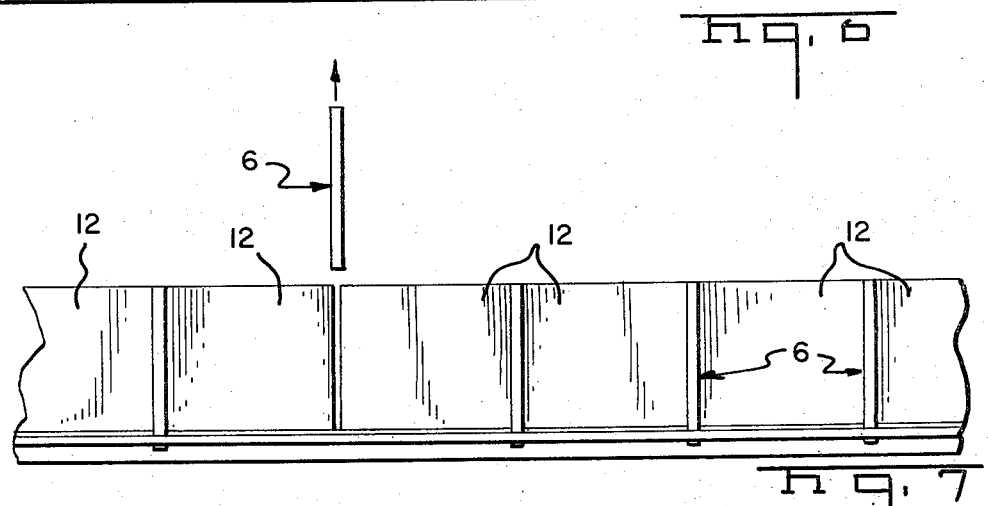
Figure 8:
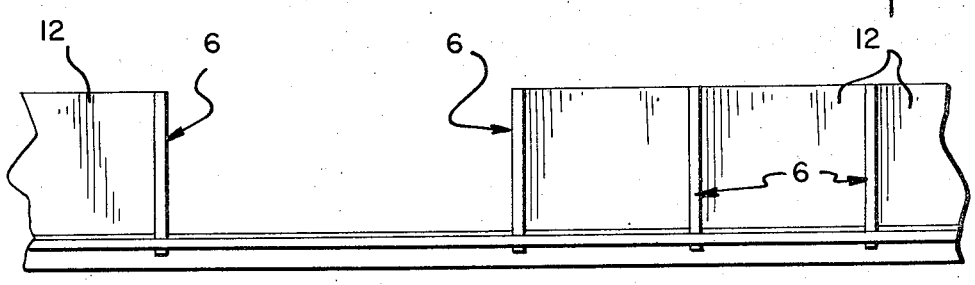

With the above described stake, the mounting and assembly of wall sections on the open truck or trailer are obvious. The stakes 6 are mounted in their pockets about the sides of the platform with the head of the T facing inwardly and the panels, cut to the proper length, are slipped into the channels provided by the bracket and inner wall of the stake. If the stake pockets are close, the stakes can be mounted in alternate pockets and stakes provided with smooth inner walls such as 9 shown in FIG. 9, mounted in the intermediate pockets for bracing the panel intermediate its edges which are retained by the alternate stakes. The sequence of steps in the diassembly of such wall sections, is shown in FIGS. 6–8. Such disassembly can be achieved from a position exteriorly of the truck by lifting any one of the stakes 6 from its socket and moving it along the height of the panel 12 until free therefrom. The two adjacent panels freed from the common stake can then be slid sideways to free their opposite edges from the retaining channels and lifted out. Cargo on the floor of the truck opposite the opening provided by the removal of a pair of panels, is thus made easily available for transfer. If a smaller opening to reach the cargo is sufficient, only one panel may be raised until its edges are released from their retaining channels and removed. Thus each panel or number of panels can form a door of any desired width at any location along the length of the truck or trailer.

Although the stake 6 as shown, is hollow and may be made of extruded aluminum integral with T-shaped bracket, the stake may have a wooden insert for imparting great rigidity thereto or the stake may be formed of stout wood, such as oak, which is wedged into the stake pocket with the hollow extruded stake 6 as shown and described slipped thereover. Furthermore, although the pocket and stake are shown as being of rectangular shape, other shapes may be used, such as triangular with the bracket formed or secured to one flat wall thereof. As a further modification, not shown, and within the teaching of the invention, the stakes may be formed with U-shaped channels extending along each lateral side and/or wall of the stake, where such stakes are of the rectangular form as illustrated. The stakes may also be made of standard length and an extension provided therefor, as for example by providing a member which slidably fits into the lower end of a stake at one end with its other end slidably fitted into the upper portion of a second and lower stake section forming a continuation of the upper stake section.

Secured within the hollow stake or post 6 adjacent its upper end as by welding, is a short length of tubing 16 which forms a socket into which the end of a bow-shaped member 18 may be inserted. The bow-shaped member, hereinafter referred to as a bow, has its opposite ends, as shown in FIG. 1, bent downwardly and inserted into the sockets of stakes on directly opposite sides of the truck or trailer. These bows form a support framework for a tarpaulin and so shape the latter as to prevent it from forming pockets for retention of rain or snow. Instead of utilizing a socket in the form of tube welded to the hollow stake, a wooden block having an opening therethrough can be forced into the open upper end of the stake for this purpose.

Figure 9:
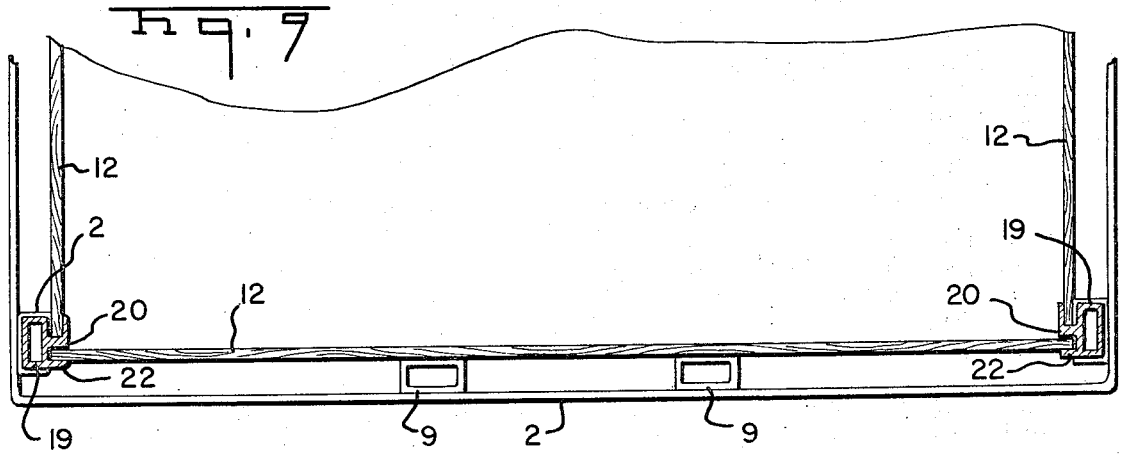
FIG. 9 is a cross-section along line 9—9 showing the end or tail-gate wall of a truck in accordance with the invention.

In providing an additional end wall for the load carrier and which forms a tail-gate therefor, corner stakes such as 19, in FIGS. 9 and 13, may be provided. Such removable stakes are each provided with a bracket which can retain the edges of two panels at right angles to each other. Such corner stake is provided with an angle member 20, one side of which extends edgewise from the inner face of the 121 stake intermediate its edges, and the other side of the angle member extends parallel to the inner face. A second wall 22 spaced from the side of angle member 20 by the thickness of a panel, is attached to the stake edgewise and projects from the inner face of the stake at right angles thereto. The stakes 19 may also be provided with sockets for supporting the ends of the tarpaulin supporting bows in the manner heretofore described. If the angle member 20 and wall 22 are made to terminate short of the ends of the stake by at least the length of a pocket 2, it is seen that these stakes could then be interchangeably used at either corner by turning them upside down to properly function at a desired corner.

A modified form of stake 24 is shown in FIGS. 10–12 and 15. In this form, instead of the head 10 of the T extending along the entire length of the leg portion or web 8 as heretofore described, the head is interrupted to form portions 10a, 10b, 10c etc. spaced from each other along the leg portion. Correspondingly, the edge portions of the panels are notched to accommodate the heads of the T-shaped portions as shown in FIG. 12. When the sides to be used for the truck or trailer exceed a height such as about three to four feet, it becomes difficult for an average person to disassemble the sides and stakes, in the manner shown in FIGS. 6–8, by raising the stake above the panel or the panel above the stake in order to free one from the other. This is especially difficult when done by a person who is standing on the ground beside the truck. With the form of stake shown in FIGS. 10–12 and 15, the stake 24 need only be raised sufficiently to free it from the pocket within which it rests, at which point the head portions 10a, 10b and 10c are opposite the openings formed by the notches in the edges of the adjoining panels. Such upward movement of the stake 24 need not exceed much more than about six inches, which is the depth of the pocket. It should be noted that the notches in the panels are so located and the lengths of the head portions 10a, 10b and 10c are such that when the stake 24 is fully seated in the pocket 2, unnotched marginal edge portions 12a, 12b, 12c of the pannel will be retained within the channel formed between the interrupted head portions and inner wall of the stake.

FIGS. 14 and 15 show details of a sectional "door" assembly which can be provided at any location along the length of the trunk. The two panels 12, 12 in these Figures, are shorter than the other panels making up the enclosure and the stake 24 of the form shown in FIG. 10, is shorter than the stakes 24a, 24b on either side thereof. In order to compensate for the lack of height, a header bar 26 is provided with its ends retained in the channels provided in stakes 24a and 24b. A stop 28 is secured on each of the stakes 24a and 24b at the proper height to support the header bar 26 at the level of the top edge of the short panels across which it extends. A socket member 30 provided with a clamping or any other securing means can be attached to the top of the header bar 26 for supporting one end of the bow 18. With this arrangement the tarpaulin, whcih extends over the bows 18 from one end of the truck to the other and tied down by ropes to the rail 2, may be untied in the vicinity of the short stake 24 and laid back on top of the bow support 18. The header bar 26 need not removed by raising it from the stops 28 and channels in stakes 24a and 24b to remove the doors. The stake 24 with its interrupted T-shaped sections then raised sufficiently to enable it to be removed from its pocket and through the adjoining notched panels, as described above. The notched panels can then be easily removed from their stakes 24a and 24b to form an open door without having to disturb any other panel or removing the tarpaulin and its supports.

The stake or post 32 shown by a horizontal cross-section therethrough in FIG. 16 is similar to the stake heretofore described with respect to that shown in FIG. 5. The web 34 which is secured to or integral with the wall 36 centrally thereof, extends therefrom at substantially a right angle and is provided at its outer edge with a channel member which is U-shaped in cross-section, the open end of the channel facing away from the wall 36 of the stake and inwardly toward the opposite side of the truck. As is apparent, three adjoining channels are thus formed within which the edge portions of panels may be retained. This stake is especially useful where it is desired to install a partition at some location across the truck or trailer in order to compartmentalize the cargo.

The stake or post 40 shown in FIG. 17 is a variant form of stake 32 for the purpose of retaining the edges of three adjoining panels. The side of each of a pair of laterally spaced angle bars 42a and 42b is secured to or integrally formed edgewise with the inwardly facing wall of the stake 40. The attached pair of sides are laterally spaced from each other by the thickness of a panel. The U-shaped channels formed between the other sides of each of the angle bars and the wall 44 face away from each other and accommodate the edge portion of a panel, respectively. Extra wall panels or those not in use can be easily supported on a base member 46 attached to the front wall of the trailer and held in place by angle brackets, as shown in FIG. 18.

The structure of the stakes or posts described above and the manner in which they are utilized to provide an easily assembled, and just as easily disassembled, enclosure for the load carrying bed of a truck, trailer or flat car has numerous advantages in the cargo transporting industry as pointed out above. In accordance with the purposes and concepts of this invention, the stakes hereinabove described can be utilized for panels of various lengths and widths. The extruded hollow aluminum stakes may be of a standard short length if so desired. If side panels much larger than the lengths of the stakes are required for the cargo being carried, extensions of any desired length may be provided as previously described, to increase the height of the posts or stakes to accommodate higher wall panels. The panels may also be of standard heights and two or more panels may be used, one on top of the other between two stakes, when the longer or extended stakes are used. The versatility of the structure herein disclosed, with respect to its ease of handling, minimum of storage space, weight and cost is outstanding.

Having thus described my invention with the particularity required by the statutes obvious changes and modifications thereof are considered to be within the scope of my invention as defined by the following claims.

What is claimed is:

1. For use in a load carrying vehicle having a platform and no side enclosure and provided with like stake pockets of predetermined depth spaced about the edge of the platform and open upwardly, means for removably retaining a panel along the side of the platform comprising, stakes each having its lower end of a shape and dimensions corresponding to that of a pocket and insertable therein for firm retention thereby in upright position, each of the stakes having a planar wall facing the opposite side of the vehicle when mounted in a pocket,
and wall means secured to and projecting from the stake and forming with said planar wall a paid of adjacent U-shaped channels having a common bottom wall for accommodating the thickness of a panel with the open channels facing in different directions, at least one end of the channels being open,
the wall means extending along the length of the stake and terminating at a distance from its other end substantially equal to the depth of the pocket, said wall means being spaced from the planar wall to overlie and rest on the platform when the stake is mounted in the pocket.

2. The structure of claim 1 wherein the upper end of the stake is provided with socket forming means for receiving one end of a tarpaulin support member.

3. The structure of claim 2 wherein a pair of wall members project from the outer surface of the wall means, the wall members being parallel and spaced apart the thickness of a panel to form a U-shaped channel facing the opposite side of the truck with the stake positioned in the pocket.

4. Means for installing side and/or end walls on the load carrying platform of a vehicle in which the platform is provided along its edges with spaced stake receiving upwardly open pockets, the stakes each having a lower end conforming to the shape of the respective pocket for slidable entry thereinto for retention in upright position, at least one of the stakes having a substantially planar side with a plurality of longitudinally spaced wall portions forming with said planar side a plurality of longitudinally extending channels facing outwardly in opposite direction, the open sides of the channels of adjacent stakes facing each other, the side edge of a panel extending between said stake and an adjacent stake being slidably retained in the channels and provided with notches which are of a size to pass the wall portions as the side of a stake and a side of the panel are moved toward and away from each other.

5. The structure of claim 4 wherein the open sides of the channels face in opposite directions away from each other.

6. In a load carrying platform of a vehicle having stakes supported by stake pockets about the platform and panels extending between and removably retained at their edges by the stakes for boxing in the platform,
   one of the stakes being shorter than the adjacent stakes on both sides thereof,
   door panels extending between and removably retained by the shorter stake and said adjacent stakes and of a height substantially that of the shorter stake,
   a header board above said door panels extending between and supported by said adjacent stakes,
   a plurality of tarpaulin supporting bows extending over and across the platform,
   means on said header board for supporting one end of a bow support,
   said shorter stake and side edges of the door panels retained thereby being provided with cooperating interlocking means which are separable by an upward movement of said shorter stake out of its pocket followed by a horizontal movement away from said door panels,
   whereby the door panels may be removed without removing the tarpaulin.

7. In a load carrying platform as in claim 6, wherein the interlocking means on the shorter stake and side edges of the door panels comprise,
   a plurality of longitudinally spaced wall members spaced the thickness of a door panel from and in parallel confronting relation to the stake to form channels opening in opposite directions away from each other, the adjacent edges of the pair of door panels having notches therein each of a size to permit passage of a wall portion therethrough when a pair of notches are in confronting relation.

* * * * *